United States Patent [19]
Yancey

[11] 3,835,349
[45] Sept. 10, 1974

[54] SOLID STATE ELECTRONIC STAGE LIGHTING CONTROL CIRCUIT

[76] Inventor: Leroy D. Yancey, 1834 S. Oakmont Dr., Bountiful, Utah

[22] Filed: Aug. 6, 1973
[21] Appl. No.: 386,039

[52] U.S. Cl. .................. 315/194, 315/160, 328/144
[51] Int. Cl. .......................................... H05b 39/04
[58] Field of Search ............ 315/99, 111, 162, 194, 315/160, DIG. 4; 328/144

[56] References Cited
UNITED STATES PATENTS

| | | | |
|---|---|---|---|
| 3,376,471 | 4/1968 | Boucher | 315/194 X |
| 3,414,766 | 12/1968 | Miller | 315/194 |
| 3,697,821 | 10/1972 | Johnson | 315/194 X |

*Primary Examiner*—John S. Heyman
*Attorney, Agent, or Firm*—David V. Trask; William S. Britt; Thomas J. Rossa

[57] ABSTRACT

An electronic control circuit for controlling the luminescence of incandescent lamps used in theaters for stage lighting is constructed by interconnecting control signal input means, a solid state triggering circuit and output means to a controllable main power supply apparatus such as a silicon-controlled rectifier device (SCR). The control circuit also includes power supply means to provide direct current operating pulses and bias voltages to circuit components, and a feedback circuit to provide for stable and automatic operation. The electronic control circuit provides a square law relationship between a linear scaled indicia of adjustment means of an external signal source, which supplies an input control signal to the circuit, and the luminescence of the incandescent lamps.

12 Claims, 3 Drawing Figures

PATENTED SEP 10 1974

3,835,349

SHEET 2 OF 2

SOLID STATE ELECTRONIC STAGE LIGHTING CONTROL CIRCUIT

BACKGROUND OF THE INVENTION

Field:

This invention relates to solid state electronic circuits and to theater (stage) lighting control systems. Specifically, this invention provides a solid state electronic control circuit for a solid state main power supply apparatus which regulates the luminescence of the incandescent lamps of a theater lighting system.

State of the Art:

Theater lighting control systems which control the luminescence of stage lights (incandescent lamps) are well-known. U.S. letters Pat. No. 2,920,240 (Macklem) describes several such systems, including thyratron and magnetic amplifier apparatus. Macklem specifically discloses the suitability of silicon-controlled rectifiers (SCR's) to theater control systems. However, SCR control systems, as therein disclosed, and as disclosed in U.S. letters Pat. No. 3,335,318 (Yancey), and similar controllable solid state systems (e.g., thyristor devices, notably TRIACS), have generally proved unreliable. High-level operating voltages and currents used in the control circuits produce excessive heat. In addition, the control circuitry is located in close proximity to the main power thyristors of the control system. These thyristors also produce an appreciable amount of heat. One result has been frequent control system failure. Yet, repair has proven to be quite difficult because the control circuitry is integrated with the main power circuitry. Moreover, repair can be dangerous because the circuit must often be energized to facilitate diagnosis. Thus, extensive electrical and electronic expertise is required to effect repairs. It has been particularly difficult to properly align and adjust the control circuitry because the heat generated in the apparatus causes component values (e.g., capacitance) to drift with temperature in operation and to vary considerably over time.

SUMMARY OF THE INVENTION

The present invention provides a solid state electronic control circuit for controlling the conductivity of the main power silicon-controlled rectifiers (SCR's) or similar controllable solid state main power apparatus of a theater lighting system. The control circuit includes power supply means, control signal input means, triggering circuit means, inverse feedback circuit means and output means. It is preferably constructed as a single unit circuit board.

The power supply receives power from an external source and distributes direct current (DC) power to the triggering circuit, the feedback circuit and the output means. A variable input signal which is selected by positioning adjustment means on an external signal generator, is received through the control signal input means and supplied to the triggering circuit. The feedback circuit receives the output of the triggering circuit and supplies a feedback signal to the triggering circuit inversely proportional to the output of the triggering circuit. The output of the triggering circuit is also supplied to the output means which supplies the signal regulating the conductivity of the theater lighting system main power thyristors, usually TRIACS or SCR's. The control circuit provides for a square law relation between the physical positioning, usually represented by a linear indicia scale, of the external signal generator adjustment means and the luminescence of the incandescent lamps.

In another embodiment of the invention the power supply provides a threshold voltage to the control signal input means. The threshold voltage operates to ensure the existence of a control circuit output signal sufficient to allow the main power solid state apparatus to supply that amount of power needed to keep the filaments of the theater lighting incandescent lamps energized and warm without luminescence when the variable input signal is adjusted below a level sufficient to so allow.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
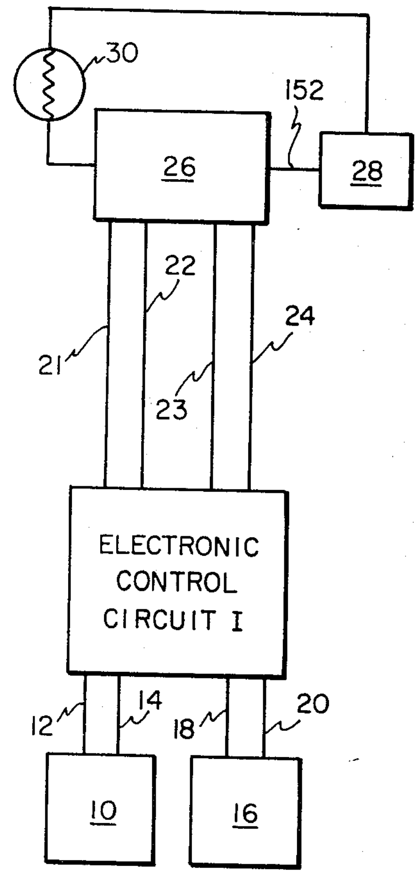
FIG. 1 is a block diagram illustrating the electronic control circuit of this invention.

FIG. 1 depicts the electronic control circuit I of this invention and other components of a theater (stage) lighting control system in block diagram format. Specifically, the control circuit I receives electrical power from a first external source 10 over conductors 12 and 14. A variable control signal is provided from a second external source 16 over conductors 18 and 20. The control circuit I supplies a control signal via conductors 21, 22, 23 and 24 to the main power silicon-controlled rectifiers (SCR's) 26 of a theater lighting system. The SCR's receive main power from a third external (main power) source 28 and, in turn, supply power to associated incandescent lamps 30. In operation, variation of adjustment means associated with the signal source 16 permits the conductivity of SCR's 26, and in turn the luminescence of incandescent lamps 30, to be varied as desired by the operator. As more fully discussed hereinafter, the control circuit I is constructed to provide a square law relation between the physical positioning of the adjustmeans of a signal source 16 and the luminescence of incandescent lamps 30. Such relationship allows for ostensible (though not actual) linearity between adjustment means movement and related observable changes in luminescence of the incandescent lamps 30.

Figure 2:
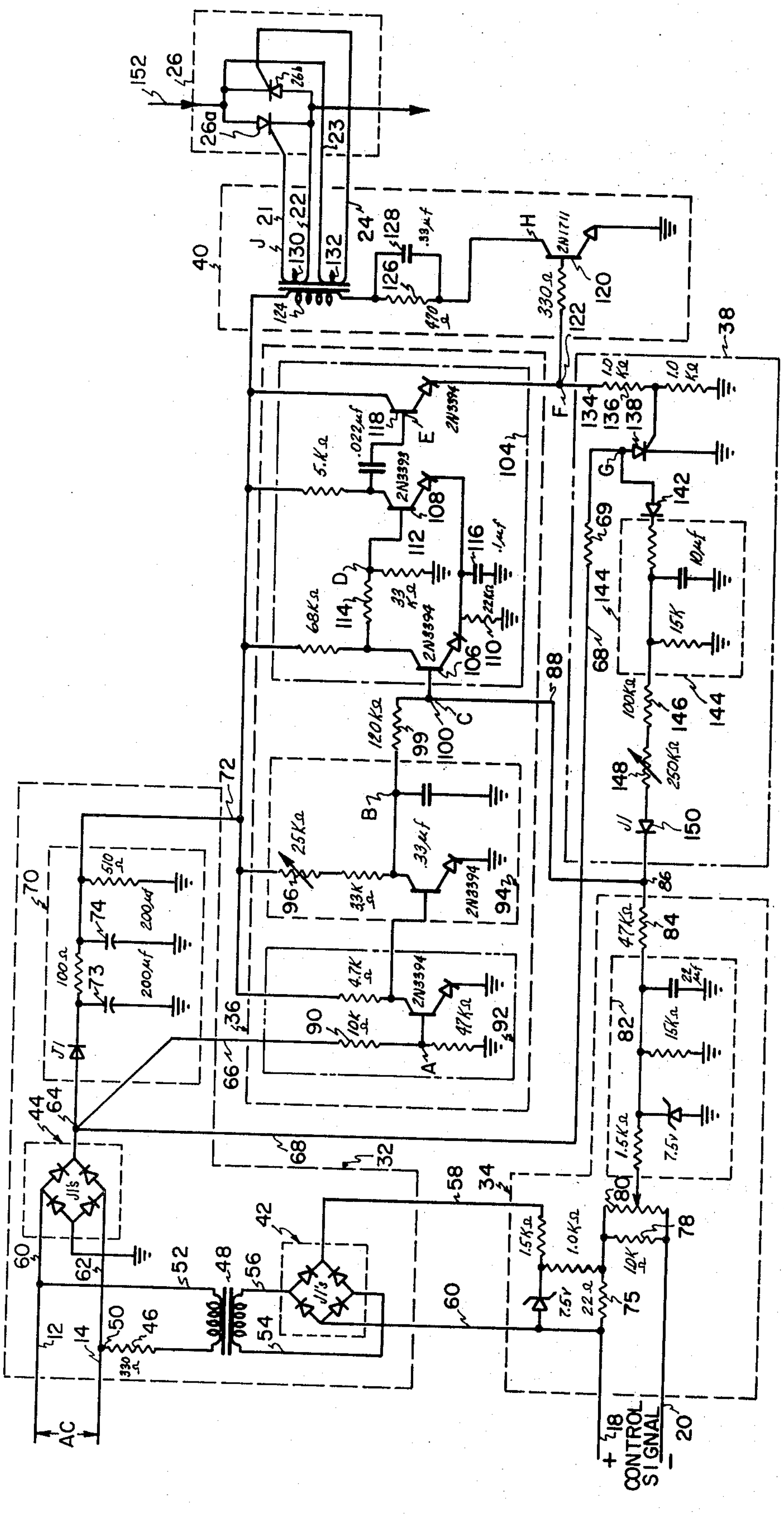
FIG. 2 is a detailed circuit diagram of a preferred embodiment of the invention.

The electronic control circuit I of FIG. 1 is illustrated in detail in FIG. 2. It includes several component circuits which function, respectively, as power supply means 32, control signal input means 34, triggering means 36, inverse feedback means 38, and output means 40. As shown, circuit power (e.g., 24V, 60Hz) is delivered over conductors 12 and 14. It is distributed in power supply 32 to first and second rectifiers 42 and 44, respectively. The first rectifier 42 receives external alternating current (AC) power through a current-limiting resistor 46 and isolation transformer 48 via conductors 50, 52, 54 and 56. The direct current (DC)

output of this rectifier 42 is supplied to the control signal input circuit 34 through conductors 58 and 60.

The second rectifier 44 of the power supply 32 receives AC power via conductors 60 and 62 and supplies a pulsating DC signal via node 64 (1) to trigger circuit 36 over conductor 66, and (2) to feedback circuit 38 over conductor 68. The rectifier 44 also supplies DC power via node 64 through filter means 70 and conductor 72 as bias voltage to both the trigger circuit 36 and the output means 40.

A double-capacitor filter arrangement 73, 74 is shown as filter means 70 in lieu of a more conventional zener-diode-capacitor filter arrangement. The double-capacitor filter arrangement 73, 74 is preferred because in addition to its filter function, it operates to regulate the power supplied to incandescent lamps 30 by the SCR's 26. The double-capacitor arrangement 73, 74 causes AC input power variations to be reflected inversely to the output means 40. As a result, when AC input power increases, the SCR conduction angle will decrease, and when AC input power decreases, the SCR conduction angle will increase. The power supplied to incandescent lamps 30 is regulated in this fashion; that is, it is substantially unaffected by variations in AC input power. With a conventional zener filter arrangement, AC power input variations would be reflected on the power supplied to incandescent lamps 30.

The control signal supplied to the control signal input means 34 is a variable DC voltage. A suitable signal may be derived, for example, from the output of a rectifier with a substantially linear output with respect to a scale associated with a control knob. Such an apparatus may comprise the signal source 16.

In theater lighting operations, it is often desired to cause extinguishment of the incandescent lamps 30. But to completely remove all electrical power from the lamps 30 will allow the filaments of lamps 30 to cool. Continuous energization at a power level producing virtually no light is thus desirable to improve lamp response time when luminescence is again desired. Further, continuous energization of the filaments of the lamps 30 improves their useful life by minimizing filament embrittlement which ordinarily results from frequent heating and cooling.

In the preferred embodiment illustrated, a DC threshold voltage is provided by power supply 32 via conductors 58 and 60. This threshold voltage induces an output from the control signal input means 34 of sufficient value to cause the SCR's 26 to conduct at a preselected level even when the control signal is adjusted to cause extinguishment of lamps 30. The level of conduction is selected to energize the filaments to just below their lumination level. The value of the threshold voltage is fixed by the resistive values of resistors 75 and 76. Other embodiments of this invention may omit provision for the aforedescribed threshold voltage, either because of individual operator preference and/or the overall requirements of a particular theater lighting system.

As illustrated, the threshold voltage is applied across series resistor 75. Thus, the threshold voltage and the control signal are combined and applied across shunt resistor 78 and alignment potentiometer 80. The potentiometer 80 is provided to allow for adjustment of the output signal from the control signal input means 34. Such adjustment is necessary to effect and maintain proper circuit operation due to component tolerances and variances in operating environments. The combined control signal and threshold voltage, as adjusted by potentiometer 80, is then filtered by filter means 82 and supplied via isolation/dropping resistor 84 to node 86, where it is combined with the output of the inverse feed-back circuit 38. The resulting combined signal is supplied to the triggering circuit 36 via conductor 88.

Figure 3:
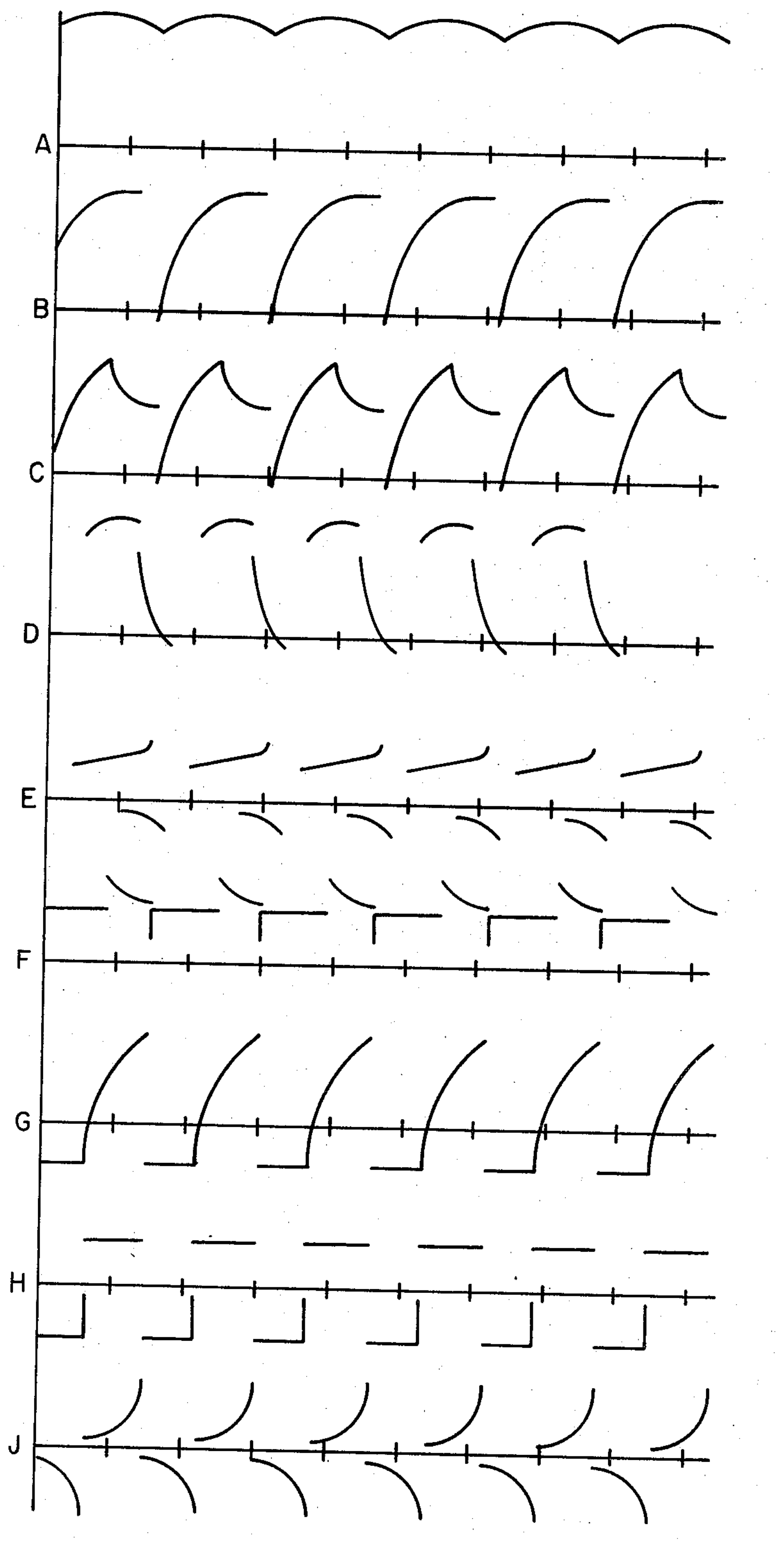
FIG. 3 is a wave form chart illustrating the characteristics of signals present at selected points in the circuit of FIG. 2.

Referring now to the triggering circuit 36, FIG. 2, and the wave form chart of FIG. 3, a pulsed DC signal A from power supply 32 is delivered via conductor 66 and biasing/dropping resistor 90. This pulsed DC signal (Signal A) operates trigger circuit 92 which in turn triggers ramp voltage generator 94. Potentiometer 96 adjusts the bias voltage received from power supply 32, which in turn adjusts the ramp generator output signal B. The ramp signal (Signal B) is supplied via dropping-/isolation resistor 99 to node 100, where it is combined with the output signals of the control signal input means 34 and the feedback circuit 38 to comprise Signal C. Signal C is then fed to a wave shaping and forming circuit 104.

As shown, wave shaping and forming circuit 104 includes a Schmidt Trigger (transistors 106 and 108; biasing resistors 110, 112 and 114; and capacitor 116) and a firing transistor 118. The output Signal F from the wave shaping and forming circuit 104 is supplied to a transistor 120 of output means 40 via node 122. Transistor 120 converts Signal F into square wave signal H which is supplied to the primary of isolation pulse transformer 124 through biasing resistor 126 and smoothing capacitor 128. The output Signal J produced on the secondary of transformer 124 is applied to control the conductivity of the main power SCR's 26. As shown, two separate outputs 130, 132 operate to control two SCR's 26*a* and 26*b*.

The triggering circuit output Signal F is also supplied to inverse feedback circuit 38 via node 122, conductor 134 and biasing resistor 136 to control the conductivity of SCR 138. The DC voltage supplied by power supply 32 via conductor 68 and resistor 69 is shunted to ground 140 by SCR 138 in accordance with the level of its conductivity set by Signal F. That portion of DC voltage not shunted by SCR 138 is passed through blocking diode 142, filter means 144 and dropping resistors 146 and 148. Resistor 148 is variable to permit feedback signal adjustment. Diode 150 is provided to block RF signals present at node 86 generated in other circuit components. Diode 142 acts to block RF signals generated in filter means 144 from affecting stable operation of the SCR 138. Inverse feedback is obtained because the amount of voltage not shunted to ground 140 by SCR 138 is directly proportional to the level of Signal F. That is, as Signal F becomes larger, the SCR 138 is rendered more conductive, shunting more voltage to ground 140. Thus, the voltage supplied to filter means 144 is proportionally smaller.

It should be noted that the pulsed control Signals J supplied to the SCR's 26 should be in phase with the main electrical power supplied to the SCR's over conductor means 152. Phase shifting circuitry may be used to ensure in-phase operation. Preferably, however, the external sources 10 and 28 (FIG. 1) draw their power from the same main source (not shown). Since the control circuit I output Signal J is in phase with the phase of the AC signal received from the first external source 10, in-phase operation will thereby be assured.

The control circuit I provides for a square law relation between the variable signal supplied by signal source 16 and the luminescence of incandescent lamps 30. The square relationship is not directly related to the quantitative values of the signals. In other words, Signal J is not a direct function of the square of the value of the variable control input signal. Rather, the generated (actual) luminescence of incandescent lamps 30 has a square law relation to the linear indicia of the adjustment means of signal source 16, which in turn results in a linear relationship between the linear indicia of the adjustment means and observed illumination or brightness. Empirical observations have shown that direct linear control does not produce a corresponding linear change in observable brightness or illumination. Operating experience, however, suggests a preference for a simple linearly indexed adjustment means which will produce a corresponding linear change in observed brightness or illumination. The illustrated circuit accomplishes this objective, and is calibrated for this purpose by adjustment of the variable resistance 96.

Physical construction of control circuit I may be effected in a variety of ways including hard wire chassis installation. However, construction is best effected on a conventional electronic circuit board. Construction in this manner allows for easy trouble-shooting in accordance with simple replacement techniques when the circuit board is adapted to be removably installed in an appropriate chassis. Personnel safety is thereby enhanced because maintenance on defective circuit boards can safely be effected outside of the chassis, which may often need to be energized during maintenance operations.

Further interconnecting wiring between the main SCR's 26 and control circuit I is of sufficient length to permit circuit board location far enough away from the heat-generating SCR's 26 to preclude heat-induced circuit failures. In addition, the operating internal voltages and power levels of control circuit I are relatively small (i.e., less than about 30 volts). Circuit I selfgenerated heat is thereby minimized which also minimizes heat-induced failures.

It will be recognized by those skilled in the art that the functions of many of the components and circuitry herein described may be accomplished by a variety of alternate circuitry and components. For example, a UNIJUNCTION transistor would be easily adaptable to replace the Schmidt Trigger in the wave shaping and forming circuit 104. Also, TRIACS and other controllable solid state devices may be used in place of the SCR's 26 with but minor modification of interfacing components in the output means 40.

I claim:

1. An electronic control circuit for varying the luminescence of incandescent lamps, comprising:

power supply means;

a triggering circuit, conductively connected to said power supply means, including:

a first input conductively connected through a first node to control signal input means and to an inverse feedback circuit to receive a combined first control signal and inverse feedback signal, and an output conductively connected through a second node to output means;

said inverse feedback circuit having an input conductively connected to said second node to receive the output of said triggering circuit, and having an output conductively connected to said triggering circuit through said first node to supply said inverse feedback signal to said triggering circuit;

said control signal input means being conductively connected to an adjustable external signal source to receive a variable input signal, and having an output connected to said first node to supply said first control signal to said triggering circuit, said external signal source having adjustment means positionable with respect to linear scaled indicia to vary said variable input signal;

said output means conductively connected to a main power apparatus to supply a second control signal to regulate the conductivity of said main power apparatus, said main power apparatus being conductively connected to at least one incandescent lamp and to an external main power source; and wherein the luminescence of said incandescent lamps has a square law relation to said linear scaled indicia of said adjustment means to provide for an ostensible linear relationship between said linear scaled indicia and observed luminescence of said incandescent lamps.

2. The electronic circuit of claim 1, wherein said power supply means receives alternating current power from a first external source which is in electrical phase with said external main power source, and wherein said power supply means includes:

first rectifier means conductively connected through a third node to said triggering circuit and to said feedback circuit to supply an electrical signal to said triggering circuit and to said feedback circuit; and first filter means which receives electrical power from said first rectifier means through said third node, and which supplies bias voltage to said triggering circuit and to said output means via conductor means.

3. The electronic circuit of claim 2, wherein said triggering circuit includes:

a trigger device conductively connected to said second rectifier means to receive an electrical signal which causes said trigger device to generate spaced trigger signals which operate to stop and restart a ramp voltage being generated by a ramp generator conductively connected to the output of said first trigger device, said ramp voltage being adjustable by potentiometer means in electrical circuit with said ramp generator;

wave forming and shaping circuitry which is conductively connected, via a fourth node, to the output of said ramp generator and to said first input of said triggering circuit, to receive as its input the combination of said ramp voltage, said first control signal and said inverse feedback signal, said circuitry including a Schmidt trigger device and a transistor cooperatively combined to supply, as the triggering circuit output, a substantially square wave signal.

4. The electronic circuit of claim 3, wherein the maximum internal operating voltage across circuit components is less than about 30 volts.

5. The electronic circuit of claim 4, wherein said power supply means includes a second rectifier means conductively connected to said control signal input means, to supply a threshold voltage of preselected magnitude to maintain said first control signal and in turn said second control signal at a magnitude which induces said main power apparatus to conduct to energize said incandescent lamps without luminescence when said variable input signal is adjusted below a level to so maintain.

6. The electronic circuit of claim 5, wherein said main power apparatus includes thyristor means operably connected to receive said second control signal.

7. The electronic circuit of claim 6, wherein said main power apparatus includes a pair of SCR's connected in opposite polarity as said thyristor means.

8. The combination of an electronic control circuit, main power apparatus, an adjustable external signal source, and at least one incandescent lamp, cooperatively combined by conductors to form a theater lighting system, wherein said electronic control circuit is comprised of:

power supply means;

a triggering circuit, conductively connected to said power supply means, including:

a first input conductively connected through a first node to control signal input means and to an inverse feedback circuit to receive a combined first control signal and inverse feedback signal, and an output conductively connected through a second node to output means;

said inverse feedback circuit having an input conductively connected to said second node to receive the output of said triggering circuit, and having an output conductively connected to said triggering circuit through said first node to supply said inverse feedback signal to said triggering circuit;

said control signal input means being conductively connected to an adjustable external signal source to receive a variable input signal, and having an output connected to said first node to supply said first control signal to said triggering circuit, said external signal source having adjustment means positionable with respect to linear scaled indicia to vary said variable input signal;

said output means conductively connected to a main power apparatus to supply a second control signal to regulate the conductivity of said main power apparatus, said main power apparatus being conductively connected to at least one incandescent lamp and to an external main power source; and wherein the luminescence of said incandescent lamps has a square law relation to said linear scaled indicia of said adjustment means to provide for an ostensible linear relationship between said linear scaled indicia and observed luminescence of said incandescent lamps.

9. The combination of claim 8, wherein said power supply means receives alternating current power from a first external source which is in electrical phase with said external main power source, and wherein said power supply means includes:

first rectifier means conductively connected through a third node to said triggering circuit and to said feedback circuit to supply an electrical signal to said triggering circuit and to said feedback circuit; and first filter means which receives electrical power from said first rectifier means through said third node, and which supplies bias voltage to said triggering circuit and to said output means via conductor means.

10. The combination of claim 9, wherein said triggering circuit includes:

a trigger device conductively connected to said second rectifier means to receive an electrical signal which causes said trigger device to generate spaced trigger signals which operate to stop and restart a ramp voltage being generated by a ramp generator conductively connected to the output of said first trigger device, said ramp voltage being adjustable by potentiometer means in electrical circuit with said ramp generator;

wave forming and shaping circuitry which is conductively connected, via a fourth node, to the output of said ramp generator and to said first input of said triggering circuit, to receive as its input the combination of said ramp voltage, said first control signal and said inverse feedback signal, said circuitry including a Schmidt trigger device and a transistor cooperatively combined to supply, as the triggering circuit output, a substantially square wave signal.

11. The combination of claim 10, wherein the maximum internal operating voltage across circuit components is less than about 30 volts.

12. The combination of claim 11, wherein said power supply means includes a second rectifier means conductively connected to said control signal input means to supply a threshold voltage of preselected magnitude to maintain said first control signal and in turn said second control signal at a magnitude which induces said main power apparatus to conduct to energize said incandescent lamps without luminescence when said variable input signal is adjusted below a level to so maintain.

* * * * *